(12) United States Patent
Teter et al.

(10) Patent No.: US 10,374,975 B2
(45) Date of Patent: Aug. 6, 2019

(54) DYNAMIC PRIORITY CALCULATOR FOR PRIORITY BASED SCHEDULING

(71) Applicant: Raytheon Company, Waltham, MA (US)

(72) Inventors: Marcus A. Teter, Belgrade, MT (US); John J. Doubrava, Bennett, CO (US); Brenda S. Dougherty, Denver, CO (US); Jeanette Marie Booher, Denver, CO (US); Noah M. Anderson, Omaha, NE (US)

(73) Assignee: Raytheon Company, Waltham, MA (US)

( * ) Notice: Subject to any disclaimer, the term of this patent is extended or adjusted under 35 U.S.C. 154(b) by 252 days.

(21) Appl. No.: 15/350,031

(22) Filed: Nov. 12, 2016

(65) Prior Publication Data

US 2017/0142027 A1    May 18, 2017

Related U.S. Application Data

(60) Provisional application No. 62/254,958, filed on Nov. 13, 2015.

(51) Int. Cl.
*H04L 12/927* (2013.01)
*H04L 12/911* (2013.01)

(52) U.S. Cl.
CPC .......... *H04L 47/805* (2013.01); *H04L 47/826* (2013.01)

(58) Field of Classification Search
CPC ............................ H04L 47/805; H04L 47/826
See application file for complete search history.

(56) References Cited

U.S. PATENT DOCUMENTS

| 2004/0136379 A1* | 7/2004 | Liao ................. H04L 47/10 370/395.21 |
| 2007/0263528 A1* | 11/2007 | Mukherjee ............ H04L 5/0007 370/208 |
| 2010/0248771 A1* | 9/2010 | Brewer ................. H04W 72/10 455/518 |
| 2011/0205925 A1* | 8/2011 | Anderson ............... H04L 45/00 370/252 |
| 2014/0162677 A1* | 6/2014 | De Pasquale ..... H04W 28/0268 455/452.2 |

* cited by examiner

*Primary Examiner* — Hassan Kizou
*Assistant Examiner* — Hector Reyes
(74) *Attorney, Agent, or Firm* — Schwegman Lundberg & Woessner, P.A.

(57) ABSTRACT

Discussed herein are methods, devices, and systems for providing a priority-based schedule. A method or providing a priority-based schedule can include receiving, at priority processing circuitry, for each of a plurality of nodes to be scheduled, a plurality of priority type values and a corresponding weighting factor value for each priority type value of the plurality type values, determining, at the priority processing circuitry, for each of the plurality of nodes to be scheduled, a priority total based on the received plurality of priority type values and the corresponding weighting factor values, and scheduling, using scheduler circuitry communicatively coupled to the priority processing circuitry, the plurality of nodes, such that a node of the plurality of nodes with a corresponding higher priority is allocated access to the medium before another node of the plurality of nodes with a corresponding relatively lower priority.

18 Claims, 5 Drawing Sheets

DYNAMIC PRIORITY CALCULATOR FOR PRIORITY BASED SCHEDULING

REFERENCE TO RELATED APPLICATION

This application claims the benefit of priority to provisional patent application No. 62/254,958, filed on Nov. 13, 2015, which is incorporated by reference herein in its entirety.

GOVERNMENT RIGHTS

This invention was made with United States Government support under Contract Number NNG10XA03C. The United States Government has certain rights in this invention.

TECHNICAL FIELD

One or more embodiments relate to determining a priority for a node in a network of nodes, such as can be used for scheduling access to a shared medium.

TECHNICAL BACKGROUND

Scheduling can be a complicated task. Some scheduling schemes try to consider all nodes as equals and provide equal access to a shared medium. Conflicts can arise in such scheduling, such as when more nodes request access than there are slots to be allocated to such nodes.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims. Some embodiments relate to dynamic scheduling. Some embodiments relate to dynamic scheduling in a priority based scheduling regime.

The priority of a scheduling task, such as in a multi-mission situation, may change during the scheduling process. The existing priority based scheduling paradigms are generally organized so that the priority of a scheduled task, such as a task to be performed by a sensor or other instrument on a weather satellite, is fixed throughout the lifetime of the task. Should the priority shift, a means of changing the priority and communicating it to the scheduler is needed to update the priorities in such scheduling paradigms. Such a communication is cumbersome. Further, the priority could come from multiple sources and such a priority can be reconciled to compute a universal priority.

Various attempts at creating a sub-priority have been enabled in other paradigms. Generally, the sub-priority scheme is a static priority that is not changed once created. Embodiments discussed herein provide a means of creating a combination of one or more potential priority values that can be expanded as necessary to enable additional factors to be considered. The coefficients of the various priority types can be adjustable and so can the individual components of priority. The underlying scheme can help ensure easy calculation (e.g., a calculation without using up a significant amount of compute power) with repeatable results. Three priority factors, of a variety of more or fewer priority factors, considered herein include: task type priority, task priority, and mission priority. For any allocation, an instantaneous priority can be calculated and the underlying priority based scheduler can adjudicate, bump, and/or move one or more allocations on the schedule, such as to help ensure that the highest priority task(s) are allocated on the schedule. The individual components of priority can be adjustable, such through a user interface or a communication from control circuitry, making it an interactive capability.

One or more embodiments discussed herein can include a means of taking various priority concerns (e.g., priority factors) and generating a single priority value for the priority based scheduler to ingest, such as prior to scheduling and/or to adjust a created schedule. An input mechanism (e.g., a slider bar, input box, or other input mechanism) allows a user to adjust weights of the priorities to affect overall behavior of the scheduling algorithm. The dynamic priority calculator removes the necessary a priori knowledge of system priorities for all contingencies.

What follows a description for a dynamic priority calculator and scheduler. The dynamic priority calculator can help enable the ability to calculate priority using one or more of multiple factors that may not be known a priori. The relative weights of the priority factors can be adjusted during the scheduling processes, such as by a means of changing those factors in a user interface or automatically by analyzing mission data, such as with little delay between the change and the scheduling or schedule changing. To meet this need, the dynamic priority calculator includes two parts: the underlying priority calculator and the user interface or automation processor (see FIGS. 1 and 2). This description includes a basic implementation of the dynamic priority calculator using three factors to calculate priority for each item to be scheduled: task priority, task type priority, and mission priority. Other factors can easily be added or used in place of the factors discussed to adjust priority.

The operations discussed provide a means of calculating the priority of an allocation based upon multiple factors. One or more embodiments allow priority to become an ad hoc process rather than needing an understanding of all priorities (e.g., contingencies) a priori.

Figure 1:
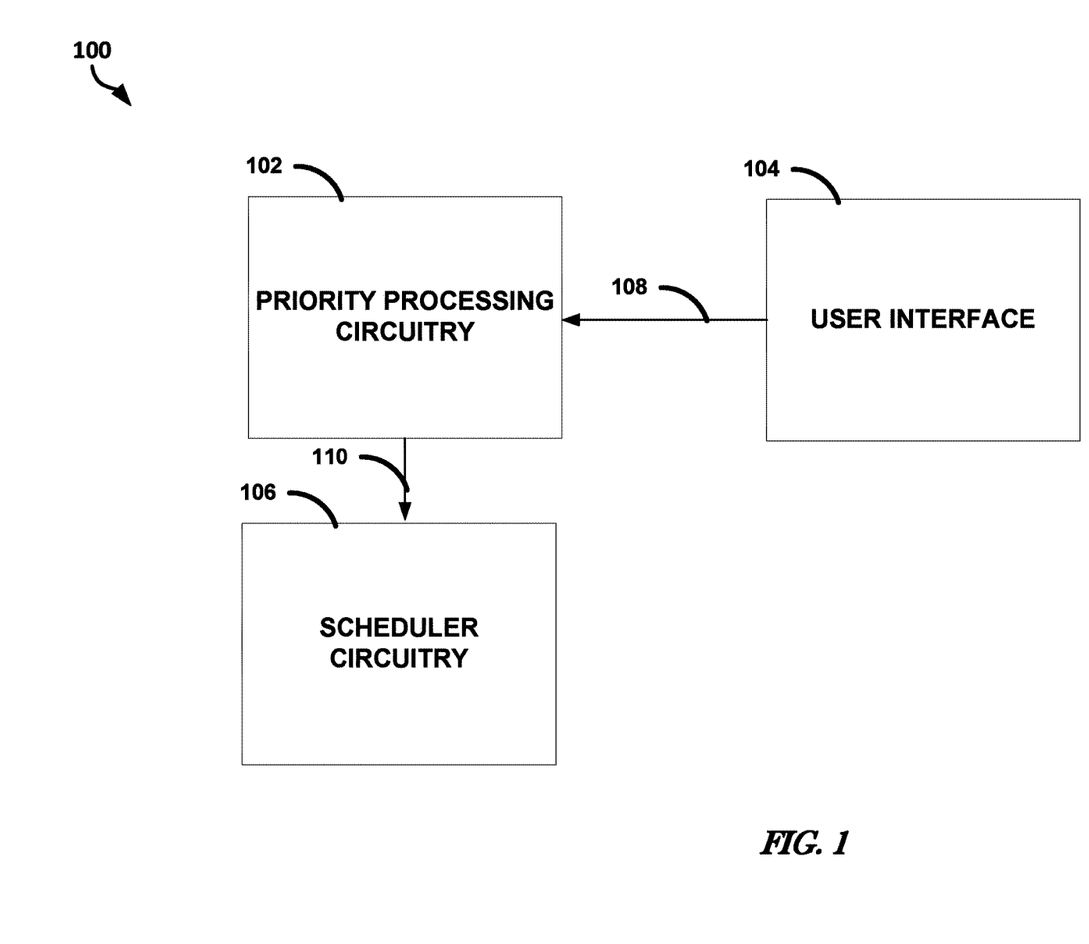
FIG. 1 illustrates, by way of example, a logical block diagram of an embodiment of a scheduling system.

FIG. 1 illustrates, by way of example, an embodiment of a system 100 for determining a priority (e.g., dynamically, such as during run time). The system 100 as illustrated includes priority processing circuitry 102 communicatively coupled to a user interface 104, such as through a connection 108. The system 100 as illustrated includes scheduler circuitry 106 communicatively coupled to the priority processing circuitry 102 through another connection 110.

The priority processing circuitry 102 can include electric and/or electronic components configured to perform operations of determining a priority based on information received from the user interface 104. The electric and/or electronic components can include one or more transistors, resistors, capacitors, inductors, diodes, oscillators, buffers, logic gates, multiplexers, regulators (voltage and/or current regulators), amplifiers (current, voltage, and/or power amplifiers), memories, antennas (e.g., one or more antennas or antenna arrays), radios (e.g., a transmit and/or receive radio), modulator/demodulator, or the like. The electric or electronic components can be configured as a circuit configured to perform operations discussed herein. The electric and/or electronic components can be configured as a state machine or an application specific integrated circuit (ASIC). In one or more embodiments, the electric and/or electronic components can include a field programmable gate array (FPGA) that can alter connections between gates thereof based on programming of the FPGA. The programming of the FPGA can thus be configured to perform operations discussed herein.

Figure 2:
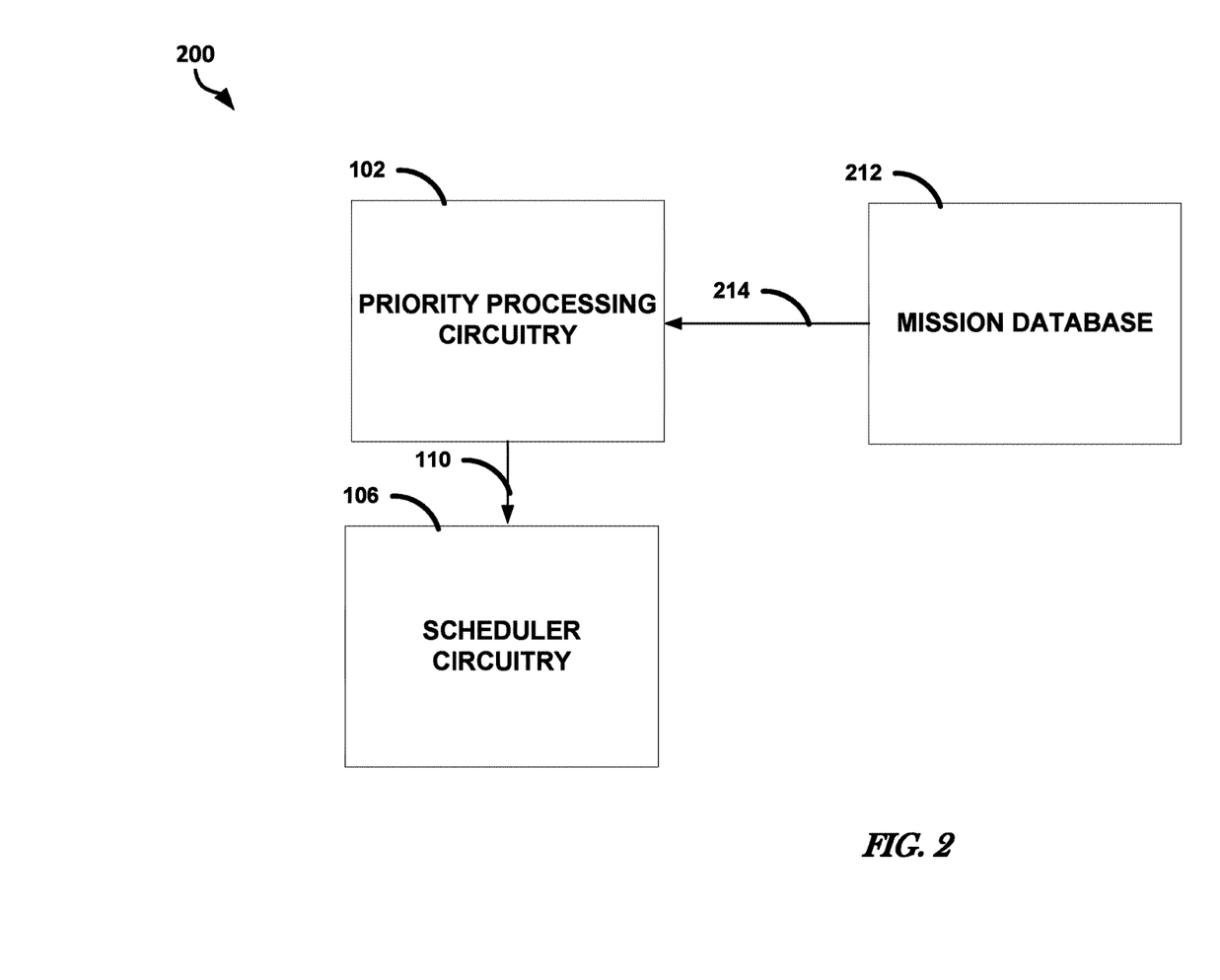
FIG. 2 illustrates, by way of example, a logical block diagram of another embodiment of a scheduling system.

The user interface 104 can provide an input device through which a user can alter a weight associated with a priority factor of a node to be scheduled by the scheduler circuitry 106. The user interface 104, in one or more embodiments, is optional and can be replaced by a device that can provide data relevant to determining a priority of a node to the priority processing circuitry 102. For example, the device can include a server that receives mission information (e.g., information regarding a phase of a mission, importance of one or more tasks of a mission, success or failure of one or more tasks of a mission, mission completion status, mission objective, or the like). The mission information can be used as inputs for the priority processing circuitry 102 to determine the priority. The information can be provided from the device, such as in response to the device detecting that new information has been provided in the database or in response to detecting that information in the device has changed. FIG. 2 illustrates an example of a user interface for altering a weight associated with a priority factor.

The priority processing circuitry 102 can perform operations to calculate a priority, such as for each of a plurality of nodes that share access to a medium. The priority calculated can be based on a linear equation, such as can include various factors being added, multiplied, subtracted, and/or divided to produce a result, such as can include a weighted sum. The priority processing circuitry 102 can simplify scheduling logic to understand where one priority factor may cease to dominate and be driven by another priority factor. Other priority formulations are possible, such as can include a probabilistic distribution, a non-linear priority calculation, or the like. A weighted linear equation approach can offer a simple to understand and easy to implement interplay of priority factors and to enable ease of expansion should another priority factor be needed in the system.

The priority processing circuitry 102 takes as input, various priority factors and their associated weighting functions (e.g., weighting factors) and generates priorities to be used by the scheduling circuitry 106. The scheduling circuitry 106 then allocates access to the medium based on the priority from the priority processing circuitry 102.

For example, consider the following priority values in Table 1 (and assume that a higher value corresponds to a higher priority).

The inputs to the priority processing circuitry 102, such as can be provided on the connection(s) 108 or 214, can include a one or more weighting factor values and/or one or more priority type values, each of which can be real numbers or integers. The output of the priority processing circuitry 102, to the scheduler circuitry 106, such as can be provided on the connection(s) 110, can include a total priority, such as for each of the nodes. The total priority can be a real number or an integer, for example. In the example of Table 1, the total priority is an integer.

In one or more embodiments, the priority determined by the priority processing circuitry 102 can be as follows:

$$P_{Total} = A*a + B*b + C*c + \ldots + 1$$

Where $P_{Total}$ is the priority A, B, and C are the weighting factors, such as can be real numbers or integers, and a, b, and c are the individual priority types, such as can be real numbers or integers. Because of the nature of the input values, the output is expected to be a real number (e.g., a positive real number) representing the priority of a particular allocation. The real number can be rounded, such as by using a floor, ceiling, round or other function on $P_{Total}$. In one or more embodiments, the numbers can be compared, by the priority processing circuitry 102, and any same numbers can be adjusted so that no two $P_{Total}$ values are the same. Such embodiments can help reduce conflicts in creating the schedule, and, if a conflict arises, the scheduling circuitry 106 will be able to handle the conflict based on the priority values. Thus, a set of priority values from the priority processing circuitry 102 can include distinct numbers. If an update to a factor (e.g., a weighting factor or a task type) is received or another node is to be added to a schedule, the priority processing circuitry 102 can update the value and compare it to the rest of the priority values for that schedule. If another node has a same priority value, the priority processing circuitry 102 can adjust one of the priority values to make each number in the set of priority values for that schedule distinct (non-equal).

The values of a, b, and c are individually set based upon factors established for each priority type. For example, the value(s) for a (note that a could be an array or a matrix of values) could be associated with mission(s). Consequently, each mission can have a default value with respect to all other missions. With all other factors being equal, the highest priority mission will have a highest associated priority type and will end up with the highest priority. In one or more embodiments, the scaling could be such that the lowest number means the highest priority—this is handled at implementation time since the scheduling algorithm's priority could mean higher number has highest priority. Care can be taken to ensure that the scales are in the same direction for all factors.

The values of A, B, and C can be either fixed with respect to each other or be dynamic for the system. For example: A could be a fixed factor, while B and C can be adjusted, such as by using slider bars or based on data received from a mission database 212. The basic assumption of the priority processing circuitry is that the priority can be simplified to a combination of the component priority. If priority is not a linear relationship, then the linear combination approach may be limited to some simple cases. A non-linear relationship can be handled by formatting or configuring the priority processing circuitry 102 to perform a non-linear operation on a number.

Some set rules that if a task has higher priority than any other task, then it is scheduled first and locked to the schedule regardless of the needs of lower priority tasks. In this interpretation, there is nothing that should be able to shift the position or change the highest priority task once it is allocated. Further, it can be difficult to understand a linear combination of priorities being considered as a means for combining different priority factors.

For the purposes of this disclosure, a slightly different interpretation of priority is used. In the altered definition "priority" means that a schedule can be altered to allow for lower priority tasks provided that the higher priority task is not removed from the schedule to accommodate the lower priority task. For example, task 1 has a high priority and is using resource X, another task 2 has a lower priority but needs to use resource X at the same time as task 1. The only way for task 2 to use resource X is that there is an alternative time or resource that could be used for task 1. If there is an alternative, then it is perfectly acceptable to schedule the lower priority task on resource X. If there is no alternative, then the scheduler circuitry 106 does not allow task 2 to use resource X.

The alternate definition of priority also allows for additional factors being considered when scheduling. For example, there is a concept of mission priority that ranks missions relative to one another. However, it only makes sense if all of the missions are attempting equivalent tasks (in terms of priority) and using the same resource. If one mission is doing something that is considered high priority and another mission is doing a low priority activity, then it makes since that the high priority activity should have a stronger contribution than the lower priority activity. In fact, one might expect that a high priority activity being tasked for a low priority mission might be important enough to out-compete a low priority activity being tasked for a higher priority mission. Enabling this possibility would be dictated by the relative priorities of the tasks, the relative priorities of the missions, and the relative weighting factors that compute the revised priority.

In some instances, the priority processing circuitry 102 may be adjusted enough to account for some unforeseen situation. The situation may have been a one-time occurrence to enable a schedule, or it might be a change in the enterprise that required a restructuring of the priorities. The dynamic priority calculator can support both instances. The intention is that the priorities are not static with the same values.

The linear equation outlined above was implemented using three priorities: mission priority, task priority, and task type priority. The mission priority was set with a set factor for the coefficient, not able to be changed through the UI 104. The task priority and the task type priority were set on slider bars that were tied together so that if the slider were set about mid-scale, both task and task type would have equal coefficients. It was also tied so that either could be shut off, but not both. See FIG. 3 for an example of such a UI.

The implemented system included a dynamic priority as part of the system configuration. The implementation included two panels, the spacecraft resource priority configuration (e.g. mission priority) and the task priority configuration. The spacecraft resource priority configuration tab has a list of spacecraft with their corresponding mission priorities. It is possible to change a mission priority for any one or more of the spacecraft, representing a means of constellation management so that scheduling could easily change do to an outage on a spacecraft or a reshuffling of mission priorities. The task priority configuration tab enables using task type or the individual task priorities or a linear combination of the two to determine what is scheduled.

FIG. 2 illustrates, by way of example, a logical block diagram of an embodiment of a system 200 for automatically updating a priority of a node. The system 200 is similar to the system 100, with the system 200 including a database 212 communicatively coupled to the priority processing circuitry 102 through connection(s) 214. The mission database 212 can receive and monitor data relevant to a mission for which nodes are being scheduled by the scheduler circuitry 106. During the course of a mission, the relative importance for a particular task, which can be carried out by one or more nodes, can change, be completed, or can become obsolete. The mission database 212 receives and monitors data regarding the mission and tasks to be performed in completing the mission. For example, if a task is completed, the mission database 212 can indicate to the priority processing circuitry 102 that a task type priority for the specific task is now zero. In another example, if a task becomes more important to the mission, the mission database 212 can indicate to the priority processing circuitry 102 that the task type priority for the task has increased or that a task type priority for other tasks of the mission has decreased relative to that task. In yet another example, a mission can be completed and the mission database can indicate to the priority processing circuitry 102 that the mission priority is now zero or the mission database 212 can indicate to one or more of the priority processing circuitry 102 and the scheduler circuitry 106 that the mission is complete and no further scheduling or priority determination is to be done fir the mission.

Figure 3:
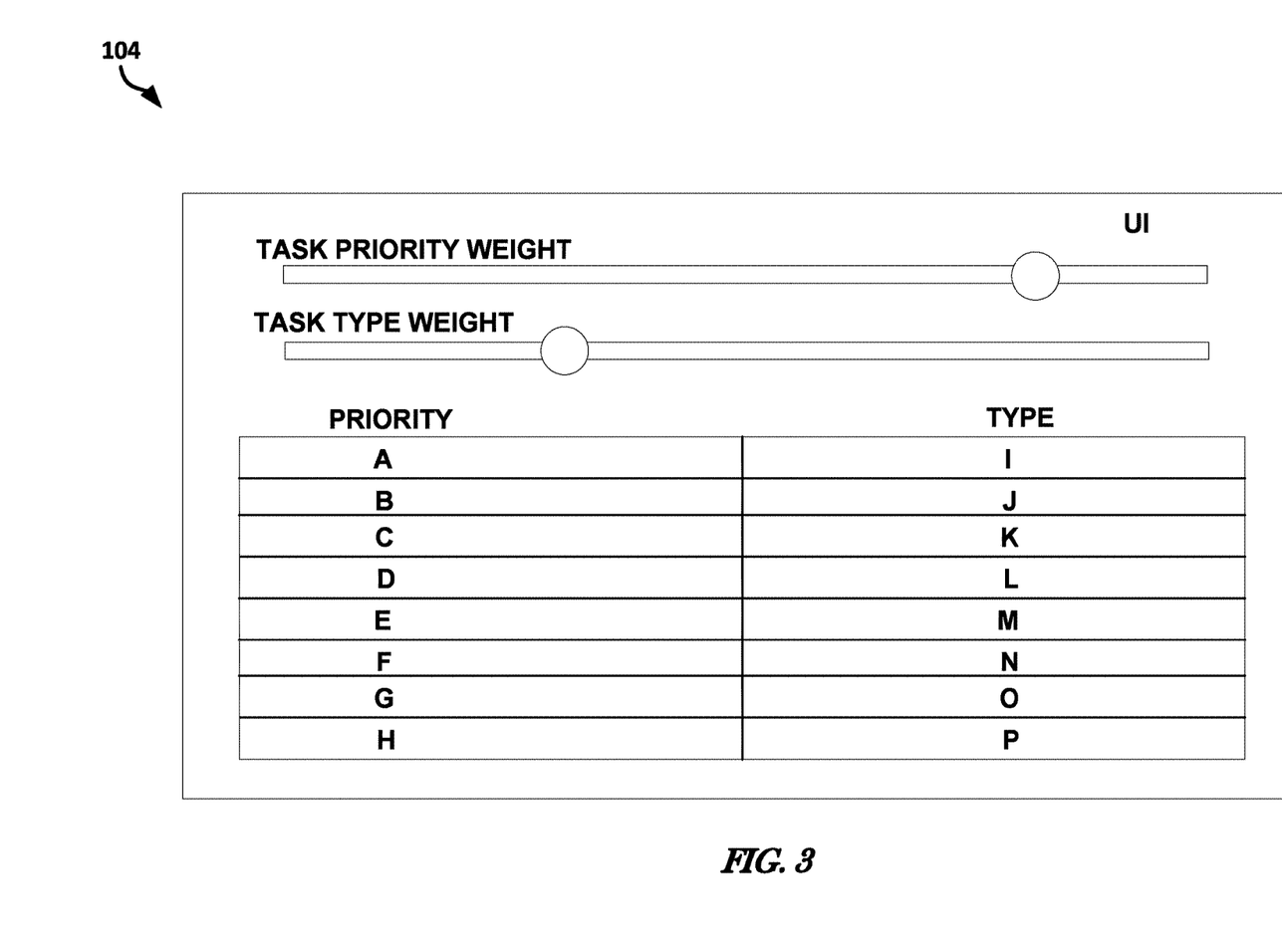
FIG. 3 illustrates, by way of example, a logical block diagram of an embodiment of a user interface.

FIG. 3 illustrates, by way of example, a block diagram of an embodiment of the UI 104. Using the UI 104 a user can select a priority or type, adjust one or more of the slider bars illustrated, and adjust the values of the task priority or task type, respectively.

Figure 4:
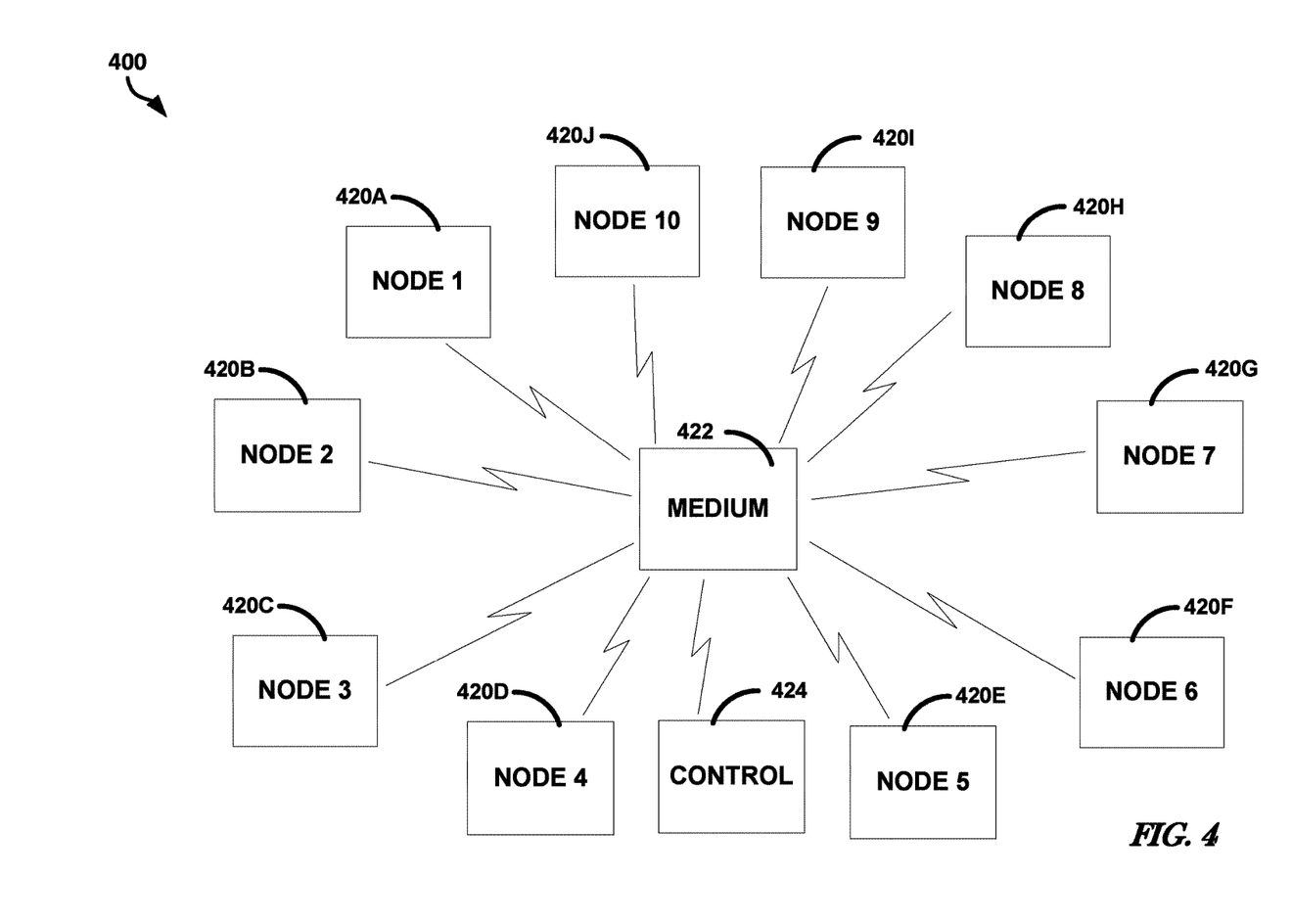
FIG. 4 illustrates, by way of example, a logical block diagram of an embodiment of a system including nodes to be scheduled.

FIG. 4 illustrates, by way of example, a logical block diagram of an embodiment of a system 400 that includes a plurality of nodes 420A, 420B, 420C, 420D, 420E, 420F, 420G, 420H, 420I, and 420J that share access to a medium 422. The system 400 includes control circuitry 424 communicatively coupled directly to the medium 422 and directly or indirectly to the nodes 420A-J. The control circuitry 424 can include and perform operations of one or more of the priority processing circuitry 102, the user interface 104, the scheduler circuitry 106, and/or the database 212. The scheduler circuitry 106 can be responsible for allocating the nodes 420A-1 with access to the medium 422. The priority processing circuitry 102 can be responsible for providing relative priorities for tasks carried out by the nodes 420A-J to the scheduler circuitry 106. The database 212, which is an example embodiment of the medium 422, can monitor data from the nodes 420A-J. Each of the nodes 420A-J can be responsible for performing one or more tasks in completing a mission.

The nodes 420A-J can include one or more of a mobile phone, tablet computer, a vehicle (e.g., a manned or unmanned vehicle, such as a land, water, and/or aerial vehicle), satellite, sensor device, or the like. The nodes 420A-J, medium 422, and/or control circuitry 424 can include communication circuitry configured to communicate with one or more other nodes 420A-J, the medium 422, and/or the control circuitry 424. The communication circuitry can include a wired or wireless communication mechanism, such as can include an antenna, antenna array, transmitter, receiver, amplifier, modulator, demodulator, Ethernet circuitry, universal serial bus (USB) circuitry, or the like. The nodes 420A-J can each be responsible for performing operations associated with one or more tasks of a mission. The nodes 420A-J can relay data related to their corresponding task(s) to the medium 422.

The medium 422, in one or more embodiments, can include database 212, a server, a processor, a relay device, such as another node, or the like. The medium 422 can be limited in terms of an amount of time, a frequency bandwidth, and/or codes that can be used to communicate data thereto. The medium 422 may need to prioritize which nodes 420A-J gain access to the medium, such as because of the limitations. To help in prioritizing the access, the priority processing circuitry 102 can determine a priority for each of the nodes 420A-J and provide the priorities to the scheduler circuitry 106. The control circuitry 424, in one or more embodiments, can include the priority processing circuitry 102 and/or scheduler circuitry 106.

Table 1 illustrates an example of ten nodes and corresponding priorities, as determined by the priority processing circuitry 102.

TABLE 1

| NODE | PRIORITY |
|------|----------|
| 420A | 5 |
| 420B | 3 |
| 420C | 1 |
| 420D | 8 |
| 420E | 6 |
| 420F | 9 |
| 420G | 2 |
| 420H | 7 |
| 420I | 4 |
| 420J | 10 |

According to the priorities determined by processing circuitry 102, the node 420C can be scheduled (by the scheduler circuitry 106) first to access the medium 422. The next node to be scheduled is 420G. In one or more embodiments, if there is a conflict between the scheduling of the nodes 420C and 420G, the node 420C will be rescheduled only if there is another slot on the schedule that does not conflict with the task(s) of the node 420C. In one or more embodiments, if there is a conflict between the scheduling of the nodes 420C and 420G, the node 420G will not be scheduled access to the medium 422 if there is a conflict and the node 420C cannot be rescheduled to a different slot.

Note that in one or more embodiments, A>B>C> .... In an example pertaining to weather satellites, A can be one or more weighting factor values of a mission, B can be one or more priority values for a task type in the mission A, and C can be one or more priority values for the specific task of the task type. The corresponding a, b, and c can be corresponding priority type values associated with the weighting factor values A, B, and C, respectively. For example, consider a first mission with a weighting factor ($A_1$) of 50, a task type with a value ($B_1$) of 100, a task with a value ($C_1$) of 100, and associated priority type values ($a_1=b_1=c_1=50$) and a second mission with a value of ($A_2$) of 100, a task type with a value ($B_2$) of 50, a task with a value ($C_2$) of 50, and associated priority type values ($a_1=b_1=c_1=50$). Even though the second mission is more important based strictly on the priority value ($A_2>A_1$), the task type and task of the first mission give this task of the first mission priority over the task of the second mission ((50*50+100*50+100*50)>(100*50+50*50+50*50)) based on determining priority based on the equation discussed previously. Thus, a higher priority task of a lower priority mission can get a higher priority than a lower priority task of a higher priority mission. Similarly, a higher priority task of a lower priority task type can get a higher priority than a lower priority task of a higher priority task type.

Modules, Components and Logic

Certain embodiments are described herein as including logic, components, circuitry, modules, or mechanisms. Modules may constitute either software modules code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems e.g., a standalone, client or server computer system), one or more processors, or circuitry may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations, such as operations discussed herein. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Electronic Apparatus and System

Example embodiments may be implemented in digital electronic circuitry, or in computer hardware, firmware, software, or in combinations of them. Example embodiments may be implemented using a computer program product, (e.g., a computer program tangibly embodied in an information carrier, e.g., in a machine-readable medium for execution by, or to control the operation of, data processing apparatus, e.g., a programmable processor, a computer, or multiple computers).

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 5:
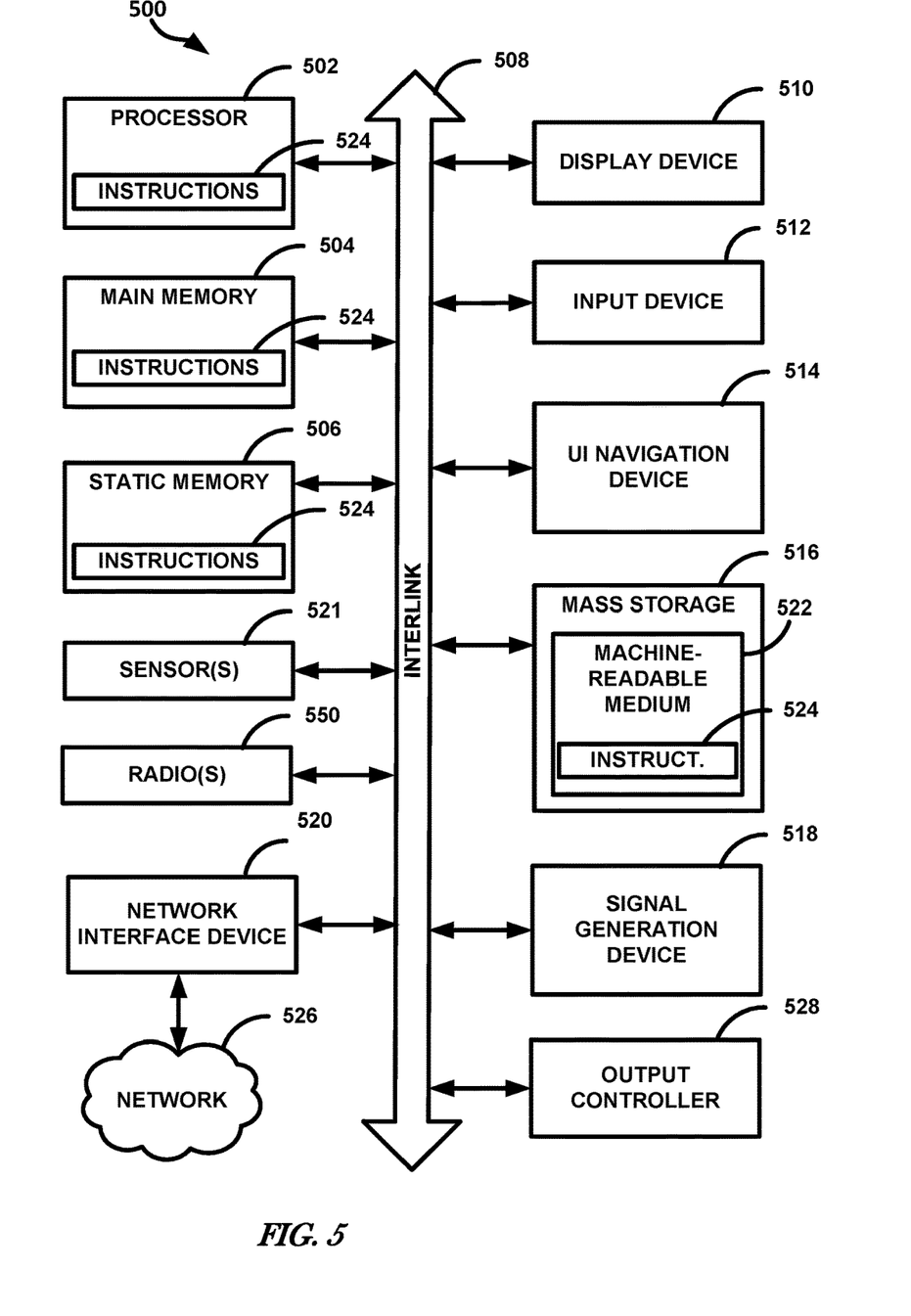
FIG. 5 illustrates, by way of example, a logical block diagram of an embodiment of a system on which one or more of the methods or operations of the methods can be performed.

FIG. 5 illustrates, by way of example, a block diagram of an embodiment of a machine in the example form of a computer system 500 within which instructions, for causing the machine to perform any one or more of the methodologies discussed herein, may be executed. In one or more embodiments, one or more of the priority processing circuitry 102, the user interface 104, the scheduler circuitry 106, the database 212, the node 420A-J, the medium 422, and/or the control circuitry 424 can include one or more components of the system 500. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker), a network interface device 520, and radios 530 such as Bluetooth, wireless wide area network (WWAN), wireless local area network (WLAN), and near field communication (NFC), permitting the application of security controls on such protocols.

Machine-Readable Medium

The disk drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium/Communication Circuitry

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Examples and Additional Notes

Example 1 includes a method for scheduling access to a medium for a plurality of nodes that share access to the medium, the method comprising receiving, at priority processing circuitry, for each of a plurality of nodes to be scheduled, a plurality of priority type values and a corresponding weighting factor value for each priority type value of the plurality type values, determining, at the priority processing circuitry, for each of the plurality of nodes to be scheduled, a priority total based on the received plurality of priority type values and the corresponding weighting factor values, and scheduling, using scheduler circuitry communicatively coupled to the priority processing circuitry, the plurality of nodes, such that a node of the plurality of nodes with a corresponding higher priority is allocated access to the medium before another node of the plurality of nodes with a corresponding relatively lower priority.

In Example 2, Example 1 further includes, wherein determining the priority includes using a linear function that takes the plurality of priority type values and the corresponding weighting factor value as input and produces the priority as an output.

In Example 3, Example 2 further includes, wherein determining the linear function is: $P_{Total}=A*a+B*b+C*c+\ldots+1$, where $P_{Total}$ is the priority, A, B, and C are weighting factor values, and a, b, and c are priority type values.

In Example 4, at least one of Examples 1-3 can further include, wherein determining the priority includes determining the priority such that a first priority type value is greater than a second priority type value and the first priority type value is associated with a first node of the plurality of nodes of a lower priority than a second node of the plurality of nodes associated with the second priority value.

In Example 5, at least one of Examples 1-4 can further include receiving, from a database coupled to the priority processing circuitry and at the priority processing circuitry, an update to a weighting factor value after the schedule has been deployed, updating the corresponding priority of the node associated with the weighting factor, updating the schedule based on the updated priority, and providing the updated schedule to nodes affected by the update.

In Example 6, at least one of Examples 1-5 can further include receiving, from the database and at the priority processing circuitry, an update to a priority type value after the schedule has been deployed, updating the corresponding priority of the node associated with the priority type value, and updating the schedule based on the updated priority, and providing the updated schedule to nodes affected by the update.

In Example 7, at least one of Examples 1-6 can further include, wherein the priority type values includes a mission type value, a task type value of an operation to be performed for the mission, and a task value for a task of the task type to be performed for the mission.

In Example 8, at least one of Examples 1-7 can further include, wherein determining the priority includes determining the priority such that a first task type value is greater than a second task type value and the first task type value is associated with a third node of the plurality of nodes of a lower priority than a fourth node of the plurality of nodes associated with the second task type value.

In Example 9, at least one of Examples 1-8 can further include, wherein the priority processing circuitry compares a priority total of the priority totals to all other priority totals for the schedule and adjusts the priority total if it is equal to another priority total of the priority totals.

Example 10 includes a system for scheduling access to a medium for a plurality of nodes that share access to the medium, the system comprising priority processing circuitry configured to receive, for each of the plurality of nodes to be scheduled, a plurality of priority type values and a corresponding weighting factor value for each priority type value of the plurality type values, and determine, for each of the plurality of nodes to be scheduled, a priority total based on the received plurality of priority type values and the corresponding weighting factor values, and scheduler circuitry communicatively coupled to the priority processing circuitry, the scheduler circuitry configured to receive the priority totals and generate a schedule for the plurality of nodes to access the medium, such that a node of the plurality of nodes with a corresponding higher priority total is allocated access to the medium before another node of the plurality of nodes with a corresponding relatively lower priority total.

In Example 11, Example 10 can further include, wherein the priority processing circuitry is further configured to determine the priority using a linear function that takes the plurality of priority type values and the corresponding weighting factor value as inputs and produce the priority totals as an output.

In Example 12, Example 11 can further include, wherein the linear function is: $P_{Total} = A*a + B*b + C*c + \ldots 1$, where $P_{Total}$ is the priority total for a node of the plurality of nodes, A, B, and C are weighting factor values, and a, b, and c are priority type values.

In Example 13, at least one of Examples 10-12 can further include, wherein the processing circuitry is further configured to determine the priority total such that a first priority type value is greater than a second priority type value and the first priority type value is associated with a first node of the plurality of nodes that is associated with a lower priority total than a second node of the plurality of nodes associated with higher priority total as compared to the lower priority total.

In Example 14, at least one of Examples 10-13 can further include a database coupled to the priority processing circuitry, the database configured to provide an update to a weighting factor value after the schedule has been deployed, wherein the processing circuitry is further configured to update the corresponding priority of the node associated with the weighting factor, and the scheduling circuitry is configured to update the schedule based on the updated priority and provide the updated schedule to nodes affected by the update.

In Example 15, at least one of Examples 10-14 can further include, wherein the database is further configured to provide an update to a priority type value to the priority processing circuitry after the schedule has been deployed, wherein the processing circuitry is further configured to update the corresponding priority total of the node associated with the priority type value, and the scheduling circuitry is configured to update the schedule based on the updated priority and provide another updated schedule to nodes affected by the update.

In Example 16, at least one of Examples 10-15 can further include, wherein the priority type values includes a mission type value, a task type value of an operation to be performed for the mission, and a task value for a task of the task type to be performed for the mission.

In Example 17, at least one of Examples 10-16 can further include, wherein the processing circuitry is further configured to determine the priority such that a first task type value is greater than a second task type value and the first task type value is associated with a third node of the plurality of nodes of a lower priority value than a fourth node of the plurality of nodes associated with the second task type value.

In Example 18, at least one of Examples 10-17 can further include, wherein the priority processing circuitry is further configured to compare a priority total of the priority totals to all other priority totals for the schedule and adjusts the priority total if it is equal to another priority total of the priority totals.

Example 19 includes a non-transitory machine-readable medium including instructions stored thereon that, when executed by a machine, configure the machine to receive, for each of a plurality of nodes to be scheduled, a plurality of priority type values and a corresponding weighting factor value for each priority type value of the plurality type values, determine, for each of the plurality of nodes to be scheduled, a priority total based on the received plurality of priority type values and the corresponding weighting factor values, schedule the plurality of nodes such that a node of the plurality of nodes with a corresponding higher priority is allocated access to the medium before another node of the plurality of nodes with a corresponding relatively lower priority, and provide the schedule to each of the plurality of nodes.

In Example 20, Example 19 can further include, wherein the instructions for determining the priority include instructions for using a linear function that takes the plurality of priority type values and the corresponding weighting factor value as input and produces the priority as an output.

In Example 21, Example 20 can further include, wherein the linear function is $P_{Total} = A*a + B*b + C*c + \ldots +1$, where $P_{Total}$ is the priority, A, B, and C are weighting factor values, and a, b, and c are priority type values.

In Example 22, at least one of Examples 19-21 can further include, wherein instructions for determining the priority include instructions for determining the priority such that a first priority type value is greater than a second priority type value and the first priority type value is associated with a first node of the plurality of nodes of a lower priority than a second node of the plurality of nodes associated with the second priority value.

In Example 23, at least one of Examples 19-22 can further include instructions that, when executed by the machine, configure the machine to receive, from a database, an update to a weighting factor value after the schedule has been deployed, update the corresponding priority of the node associated with the weighting factor, update the schedule based on the updated priority, and provide the updated schedule to nodes affected by the update.

In Example 24, at least one of Examples 19-23 can further include instructions that, when executed by the machine, configure the machine to receive an update to a priority type value after the schedule has been deployed, update the corresponding priority of the node associated with the priority type value, update the schedule based on the updated priority, and provide the updated schedule to nodes affected by the update.

In Example 25, at least one of Examples 19-24 can further include, wherein the priority type values includes a mission type value, a task type value of an operation to be performed for the mission, and a task value for a task of the task type to be performed for the mission.

In Example 26, at least one of Examples 19-25 can further include, wherein the instructions for determining the priority total include instructions for determining the priority such that a first task type value is greater than a second task type value and the first task type value is associated with a third node of the plurality of nodes of a lower priority than a fourth node of the plurality of nodes associated with the second task type value.

In Example 27, at least one of Examples 19-26 can further include instructions that, when executed by the machine, configure the machine to compare a priority total of the priority totals to all other priority totals for the schedule and adjust the priority total if it is equal to another priority total of the priority totals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for scheduling access to a medium for a plurality of nodes that share access to the medium, the method comprising:
   receiving, at priority processing circuitry, for each of a plurality of nodes to be scheduled, a plurality of priority type values and a corresponding weighting factor value for each priority type value of the plurality type values;
   determining, at the priority processing circuitry, for each of the plurality of nodes to be scheduled, a priority total based on the received plurality of priority type values and the corresponding weighting factor values;
   scheduling, using scheduler circuitry communicatively coupled to the priority processing circuitry, the plurality of nodes, such that a node of the plurality of nodes with a corresponding higher priority is allocated access to the medium before another node of the plurality of nodes with a corresponding relatively lower priority;
   receiving, from a database coupled to the priority processing circuitry and at the priority processing circuitry, an update to a weighting factor value after the schedule has been deployed; and
   updating the corresponding priority of the node associated with the weighting factor;
   updating the schedule based on the updated priority; and
   providing the updated schedule to nodes affected by the update.

2. The method of claim 1, wherein the determining the priority includes using a linear function that takes the plurality of priority type values and the corresponding weighting factor value as input and produces the priority as an output.

3. The method of claim 2, wherein determining the linear function is: $P_{Total}=A*a+B*b+C*c+ \ldots +1$, where $P_{Total}$ is the priority, A, B, and C are weighting factor values, and a, b, and c are priority type values.

4. The method of claim 3, wherein determining the priority includes determining the priority such that a first priority type value is greater than a second priority type value and the first priority type value is associated with a first node of the plurality of nodes of a lower priority than a second node of the plurality of nodes associated with the second priority type value.

5. The method of claim 1 comprising, receiving, from the database and at the priority processing circuitry, an update to a priority type value after the schedule has been deployed, updating the corresponding priority of the node associated with the priority type value, and updating the schedule based on the updated priority, and providing the updated schedule to nodes affected by the update.

6. The method of claim 5, wherein the priority type values include a mission type value, a task type value of an operation to be performed for the mission, and a task value for a task of the task type to be performed for the mission.

7. The method of claim 6, wherein determining the priority includes determining the priority such that a first task type value is greater than a second task type value and the first task type value is associated with a third node of the plurality of nodes of a lower priority than a fourth node of the plurality of nodes associated with the second task type value.

8. The method of claim 7, wherein the priority processing circuitry compares a priority total of the priority totals to all other priority totals for the schedule and adjusts the priority total if it is equal to another priority total of the priority totals.

9. A system for scheduling access to a medium for a plurality of nodes that share access to the medium, the system comprising:
   priority processing circuitry configured to:
      receive, for each of the plurality of nodes to be scheduled, a plurality of priority type values and a corresponding weighting factor value for each priority type value of the plurality type values; and
      determine, for each of the plurality of nodes to be scheduled, a priority total based on the received plurality of priority type values and the corresponding weighting factor values;
   scheduler circuitry communicatively coupled to the priority processing circuitry, the scheduler circuitry configured to receive the priority totals and generate a schedule for the plurality of nodes to access the medium, such that a node of the plurality of nodes with a corresponding higher priority total is allocated access to the medium before another node of the plurality of nodes with a corresponding relatively lower priority total; and
   a database coupled to the priority processing circuitry, the database configured to provide an update to a weighting factor value after the schedule has been deployed,
   wherein the priority processing circuitry is further configured to update the corresponding priority of the node associated with the weighting factor and the scheduling circuitry is further configured to update the schedule based on the updated priority and provide the updated schedule to nodes affected by the update.

10. The system of claim 9, wherein the priority processing circuitry is further configured to determine the priority using a linear function that takes the plurality of priority type values and the corresponding weighting factor value as inputs and produce the priority totals as an output.

11. The system of claim 10, wherein the linear function is: $P_{Total}=A*a+B*b+C*c+ \ldots +1$, where $P_{Total}$ is the priority total for a node of the plurality of nodes, A, B, and C are weighting factor values, and a, b, and c are priority type values.

12. The system of claim 11, wherein the processing circuitry is further configured to determine the priority total such that a first priority type value is greater than a second priority type value and the first priority type value is associated with a first node of the plurality of nodes that is associated with a lower priority total than a second node of the plurality of nodes associated with higher priority total as compared to the lower priority total.

13. The system of claim 9 comprising, wherein the database is further configured to provide an update to a priority type value to the priority processing circuitry after the schedule has been deployed, wherein the processing circuitry is further configured to update the corresponding priority total of the node associated with the priority type value, and the scheduling circuitry is configured to update the schedule based on the updated priority and provide another updated schedule to nodes affected by the update.

14. The system of claim 13, wherein the priority type values includes a mission type value, a task type value of an operation to be performed for the mission, and a task value for a task of the task type to be performed for the mission.

15. The system of claim 14, wherein the processing circuitry is further configured to determine the priority such that a first task type value is greater than a second task type value and the first task type value is associated with a third node of the plurality of nodes of a lower priority value than a fourth node of the plurality of nodes associated with the second task type value.

16. The system of claim 15, wherein the priority processing circuitry is further configured to compare a priority total of the priority totals to all other priority totals for the schedule and adjusts the priority total if it is equal to another priority total of the priority totals.

17. A non-transitory machine-readable medium including instructions stored thereon that, when executed by a machine, configure the machine to:
   receive, for each of a plurality of nodes to be scheduled, a plurality of priority type values and a corresponding weighting factor value for each priority type value of the plurality type values;
   determine, for each of the plurality of nodes to be scheduled, a priority total based on the received plurality of priority type values and the corresponding weighting factor values;
   schedule the plurality of nodes such that a node of the plurality of nodes with a corresponding higher priority is allocated access to the medium before another node of the plurality of nodes with a corresponding relatively lower priority;
   provide the schedule to each of the plurality of nodes;
   receive, from a database coupled to machine, an update to a weighting factor value after the schedule has been deployed;
   update the corresponding priority of the node associated with the weighting factor;
   update the schedule based on the updated priority; and
   provide the updated schedule to nodes affected by the update.

18. The non-transitory machine-readable medium of claim 17, wherein the instructions for determining the priority include instructions for using a linear function that takes the plurality of priority type values and the corresponding weighting factor value as input and produces the priority as an output.

* * * * *

UNITED STATES PATENT AND TRADEMARK OFFICE
CERTIFICATE OF CORRECTION

PATENT NO. : 10,374,975 B2
APPLICATION NO. : 15/350031
DATED : August 6, 2019
INVENTOR(S) : Teter et al.

Page 1 of 1

It is certified that error appears in the above-identified patent and that said Letters Patent is hereby corrected as shown below:

In the Specification

In Column 6, Line 32, delete "fir" and insert --for-- therefor

In Column 6, Line 49, delete "420A-1" and insert --420A-I-- therefor

In Column 7, Line 19, delete "art" and insert --an-- therefor

In Column 7, Line 19, after "and", insert --their--

In Column 8, Line 11, before "code", insert --(e.g.,--

In Column 8, Line 17, delete "e.g.," and insert --(e.g.,-- therefor

In Column 13, Line 6, delete "1," and insert --+1,-- therefor

Signed and Sealed this
Twelfth Day of January, 2021

Andrei Iancu
*Director of the United States Patent and Trademark Office*